Figure 1:
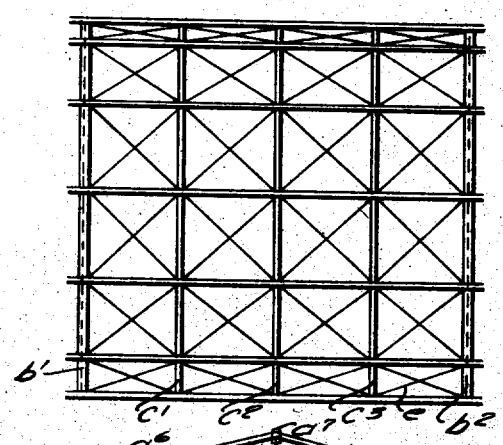

Aug. 5, 1924. Re. 15,885

K. ARNSTEIN

SKELETON FRAME CONSTRUCTION FOR AIRSHIPS AND THE LIKE

Original Filed April 8, 1922

INVENTOR
Karl Arnstein
BY
Turner Brown
His ATTORNEYS.

Reissued Aug. 5, 1924. Re. 15,885

UNITED STATES PATENT OFFICE.

KARL ARNSTEIN, OF FRIEDRICHSHAFEN, GERMANY, ASSIGNOR TO LUFTSCHIFFBAU ZEPPELIN GESELLSCHAFT MIT BESCHRANKTER HAFTUNG, OF FRIEDRICHSHAFEN, GERMANY, A FIRM.

SKELETON FRAME CONSTRUCTION FOR AIRSHIPS AND THE LIKE.

Original No. 1,456,497, dated May 29, 1923, Serial No. 550,885, filed April 8, 1922. Application for reissue filed June 14, 1924. Serial No. 720,145.

*To all whom it may concern:*

Be it known that I, KARL ARNSTEIN, a citizen of Czechoslovakia, residing at Friedrichshafen a. B., Germany, have invented certain new and useful Improvements in Skeleton Frame Construction for Airships and the like, for which I have filed an aplication for patent in Germany on April 8, 1921, and of which the following is a specification.

My invention has reference to an improved manner of constructing rigid supporting frames for air ships and the like by means of which the construction of frames of this kind is considerably facilitated.

The frames of air ships of the rigid type were originally constructed merely of rings and longitudinal supporting members connecting the same. With the increase in size of the ship and the increase of the distance between the rings it became necessary to provide means for diminishing the freely exposed length of the span between the longitudinal supports by intermediate auxiliary supporting members, and in view of this it has been suggested to provide semicircular or circular rings in the hull arranged intermediate the longitudinal supporting members, so as to subdivide the space between them and to secure greater resisting capacity against the pressure of the enclosing shell when the hull was empty. Such auxiliary rings are of great importance, inasmuch as by this means it becomes possible to increase the distance between the supporting rings without necessitating an increase of the exposed unsupported length of the longitudinal supporting members.

It is an object of my invention to provide means for avoiding the necessity of sidewise insertion of such auxiliary rings on the rigid supporting frame as practised heretofore, which method entails great expense and labor, and with this purpose in view I provide means for manufacturing the auxiliary rings in the same manner as the supporting ring upon the floor of the hall of construction by the utilization of temporary stiffening means, and I am thereby enabled, when the structure is set up, to connect the auxiliary rings to the longitudinal supports in a similar manner as the main supporting rings.

By means of this invention a great number of auxiliary or intermediary rings may be employed with the additional advantage that with a sufficient number of such rings the load on each ring is so small and the stress on the longitudinal supporting member becomes so favorably distributed that specially constructed supports or truss beams are wholly or to a large extent avoided, so that one is able to make use of ordinary flanged supporting beams.

In the drawings affixed to this specification and forming part thereof a structure embodying my invention is illustrated diagrammatically by way of example.

Figure 2:
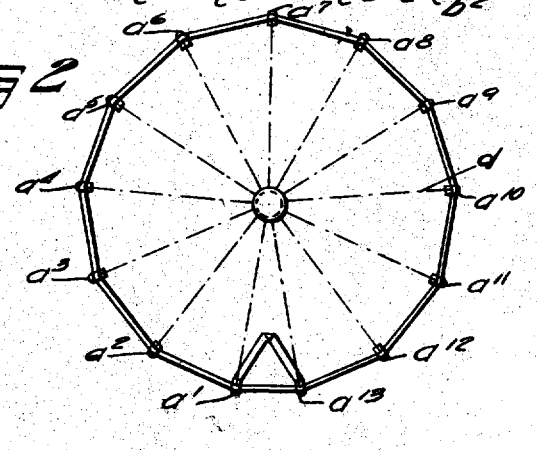

Figure 1 shows in a conventional manner a portion of the hull structure of an air ship seen from the side, Figure 2 is a cross section.

The skeleton frame of the hull comprises longitudinal supports $a^1$, $a^2$, $a^3$, $a^4$, etc., to $a^{13}$, and supporting rings $b^1$ and $b^2$. Between the said rings three auxiliary rings $c^1$, $c^2$, and $c^3$ are arranged in such a manner that these auxiliary rings are manufactured in any suitable place of manufacture as closed rings that are proof against bending and deflection; they are then provided with temporary stiffening or tensional members $d$. The auxiliary rings are then connected to the longitudinal supports, whereupon the temporary stiffening members are removed. The stiffening of the fields formed by the longitudinal supports $a^1$ to $a^{13}$ may be effected for example in the manner illustrated in Figure 1 by means of wires $e$ which extend diagonally through the fields from one point of junction to the other.

I wish it to be understood that I do not desire to be limited to the exact details of constructions shown and described, as many obvious modifications will occur to a person skilled in the art.

What I claim is:

The method of making rigid skeleton frames for air ships which consists in connecting spaced longitudinal supporting members to transversely arranged supporting rings, bracing an auxiliary ring by aid of bracing members, inserting said auxiliary ring intermediate said supporting rings and parallel to said supporting rings and removing said bracing members.

In witness whereof, I have hereunto signed my name in the presence of two subscribing witnesses.

KARL ARNSTEIN.

Witnesses:
A. GAUPP,
T. HERB.